United States Patent
Fisher et al.

(10) Patent No.: US 7,660,873 B2
(45) Date of Patent: Feb. 9, 2010

(54) SYSTEMS AND METHODS FOR COMMUNICATING MESSAGES

(75) Inventors: Gerald B. Fisher, Arden Hills, MN (US); Theodore Arthur Nesse, Stillwater, MN (US); Perali Venkata Seshu Sathyanarayana Murthy, Andhra Pradesh (IN); Sunil Kumar Neckaraje, Karnataka (IN)

(73) Assignee: General Electric Company, Schenectady, NY (US)

( * ) Notice: Subject to any disclaimer, the term of this patent is extended or adjusted under 35 U.S.C. 154(b) by 831 days.

(21) Appl. No.: 10/918,912

(22) Filed: Aug. 16, 2004

(65) Prior Publication Data

US 2006/0037069 A1    Feb. 16, 2006

(51) Int. Cl.
*G06F 15/16* (2006.01)
(52) U.S. Cl. .............. 709/217; 709/213; 709/225; 709/227; 709/232; 707/1; 707/10; 707/205
(58) Field of Classification Search .......... 709/227, 709/230, 213, 217, 232, 204, 225, 226, 245; 707/1, 10, 205, 3
See application file for complete search history.

(56) References Cited

U.S. PATENT DOCUMENTS

| | | | | |
|---|---|---|---|---|
| 5,911,044 A * | 6/1999 | Lo et al. | ............ | 709/203 |
| 5,956,509 A * | 9/1999 | Kevner | ............ | 719/330 |
| 6,006,269 A * | 12/1999 | Phaal | ............ | 709/227 |
| 6,009,462 A * | 12/1999 | Birrell et al. | ............ | 709/206 |
| 6,067,620 A | 5/2000 | Holden et al. | | |
| 6,073,172 A * | 6/2000 | Frailong et al. | ............ | 709/222 |
| 6,246,410 B1 * | 6/2001 | Bergeron et al. | ............ | 715/854 |
| 6,415,329 B1 * | 7/2002 | Gelman et al. | ............ | 709/245 |
| 6,437,692 B1 | 8/2002 | Petite et al. | | |
| 6,496,867 B1 * | 12/2002 | Beser et al. | ............ | 709/245 |
| 6,502,192 B1 | 12/2002 | Nguyen | | |
| 6,546,392 B1 | 4/2003 | Bahlmann | | |
| 6,621,827 B1 | 9/2003 | Rezvani et al. | | |
| 6,631,417 B1 * | 10/2003 | Balabine | ............ | 709/229 |
| 6,674,767 B1 * | 1/2004 | Kadyk et al. | ............ | 370/466 |
| 6,686,838 B1 | 2/2004 | Rezvani et al. | | |
| 6,704,873 B1 | 3/2004 | Underwood | | |
| 6,708,219 B1 * | 3/2004 | Borella et al. | ............ | 709/245 |
| 6,760,324 B1 * | 7/2004 | Scott et al. | ............ | 370/352 |
| 6,772,333 B1 * | 8/2004 | Brendel | ............ | 713/153 |
| 6,810,405 B1 * | 10/2004 | LaRue et al. | ............ | 707/201 |
| 6,904,057 B2 * | 6/2005 | Sarkinen et al. | ............ | 370/469 |
| 6,970,930 B1 * | 11/2005 | Donovan | ............ | 709/227 |
| 7,088,727 B1 * | 8/2006 | Short et al. | ............ | 370/401 |
| 7,111,065 B2 * | 9/2006 | Davidson et al. | ............ | 709/227 |
| 7,117,267 B2 * | 10/2006 | Bavadekar | ............ | 709/230 |

(Continued)

FOREIGN PATENT DOCUMENTS

WO    WO 02/21239 A2    3/2002

(Continued)

*Primary Examiner*—Michael Won
(74) *Attorney, Agent, or Firm*—Eugene Hyun, Esq.; Armstrong Teasdale LLP

(57) ABSTRACT

A system for communicating messages is described. The system includes a server and a gateway. The gateway sends a first message to the server. The first message queries the server to determine whether the server is ready to communicate with the gateway.

18 Claims, 4 Drawing Sheets

U.S. PATENT DOCUMENTS

| | | | |
|---|---|---|---|
| 7,346,702 B2 * | 3/2008 | Haviv | 709/238 |
| 2002/0077077 A1 | 6/2002 | Rezvani et al. | |
| 2002/0103897 A1 | 8/2002 | Rezvani et al. | |
| 2002/0107772 A1 | 8/2002 | Jain et al. | |
| 2002/0138848 A1 | 9/2002 | Alao et al. | |
| 2002/0156886 A1 * | 10/2002 | Krieski et al. | 709/224 |
| 2003/0051164 A1 * | 3/2003 | Patton | 713/201 |
| 2003/0140090 A1 | 7/2003 | Rezvani et al. | |
| 2003/0140107 A1 | 7/2003 | Rezvani et al. | |
| 2003/0149720 A1 * | 8/2003 | Goldstein | 709/202 |
| 2003/0219024 A1 * | 11/2003 | Purnadi et al. | 370/401 |
| 2005/0071423 A1 * | 3/2005 | Rajaniemi | 709/203 |
| 2005/0235044 A1 * | 10/2005 | Tazuma | 709/217 |
| 2006/0078096 A1 * | 4/2006 | Poyhonen et al. | 379/88.12 |

FOREIGN PATENT DOCUMENTS

| | | |
|---|---|---|
| WO | WO 02/21249 A1 | 3/2002 |
| WO | WO 02/21280 A1 | 3/2002 |
| WO | WO 02/21299 A1 | 3/2002 |
| WO | WO 02/21415 A1 | 3/2002 |

* cited by examiner

SYSTEMS AND METHODS FOR COMMUNICATING MESSAGES

BACKGROUND OF THE INVENTION

This invention relates generally to systems and methods for communicating messages and more particularly to systems and methods for communicating messages over a network.

Many homes and businesses include a computer system that couples via the Internet and a firewall to a server. A firewall prevents undesirable traffic from entering the computer system. The server sends commands to computer system and the commands request the computer system to provide information to the server.

It is difficult for an average-skilled person to configure a firewall because the average-skilled person usually has minimum knowledge regarding the configuration. Moreover, it is not easy for an expert to configure a firewall because the expert is usually overloaded with a wide variety of configurations of firewalls and usually does not have expertise in applying one of the configurations unique to the firewall. Hence, even if a firewall is configured by an expert, the firewall may reject the commands sent by the server.

BRIEF DESCRIPTION OF THE INVENTION

In one aspect, a system for communicating messages is provided. The system includes a server and a gateway. The gateway sends a first message to the server. The first message queries the server to determine whether the server is ready to communicate with the gateway.

In another aspect, a system for communicating messages is provided. The system includes a server and a gateway. The gateway sends a message frame to the server. The message frame includes a first portion and a second portion. The first portion is converted by applying a first protocol and the second portion of the message frame is converted by applying a second protocol that is different from the first protocol. The second portion queries the server to determine whether the server is ready to send a command to the gateway.

In yet another aspect, a method for communicating messages is provided. The method includes coupling a gateway to a server via a network and querying the server to determine whether the server is ready to communicate with the gateway.

DETAILED DESCRIPTION OF THE INVENTION

Figure 1:
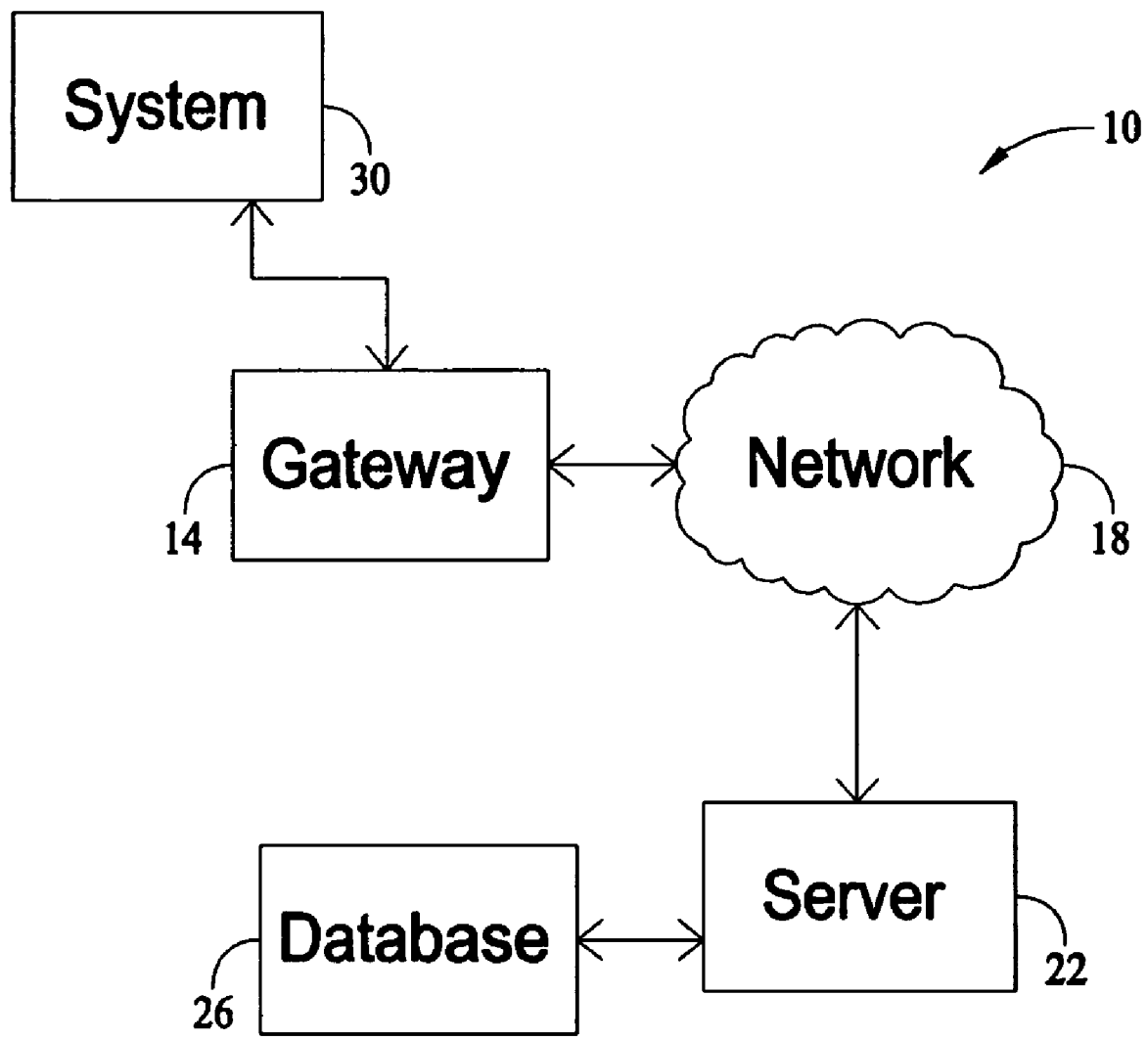
FIG. 1 is a block diagram of an embodiment of a system for communicating messages.

FIG. 1 is a block diagram of an embodiment of a system 10 for communicating messages. System 10 includes a gateway 14, a network 18, a server 22 and a database 26, and is coupled to a system 30. Examples of network 18 include a wide area network (WAN), such as the Internet, and a local area network (LAN), such as an Intranet. Examples of server 22 include a computer, a processor, a microcontroller, a microcomputer, a programmable logic controller, an application specific integrated circuit, and other programmable circuits. Database 26 is a computer readable medium, such as a random access memory (RAM), a read-only memory (ROM), a programmable read-only memory (PROM) and an electrically erasable programmable read-only memory (EEPROM). Other examples of computer-readable mediums that store information stored within database 26 include floppy discs, digital versatile discs (DVDs) and compact discs (CDs). As another example, database 26 includes a database, such as, for instance, Corel™ Paradox™, Oracle®, Microsoft® Access™, MySQL™, and Microsoft® structured query language (SQL) server, created and managed using SQL, and stored within a computer-readable medium. Examples of system 30 include a security system that monitors security of an area, such as a corporation and a dwelling. Other examples of system 30 include a heating system that monitors and provides heat to the area, a cooling system that monitors and cools the area, and a lighting system that monitors and provides light within the area.

System 30 monitors and conveys parameters, such as a security breach within the area, an amount of heat within the area, a temperature within the area, and an intensity of light in the area, to gateway 14. Gateway 14 periodically transmits a ping message via network 18 to server 22. An example of the ping message is a message that queries whether server 22 is ready to communicate with gateway 14. Server 22 is ready to communicate with gateway 14 when database 26 to which server 22 has access includes either a command or data designated to be sent to gateway 14. An example of a command that server 22 sends to gateway 14 when server 22 is ready to communicate is a request, such as a request to send the parameters to server 22. Server 22 is not ready to communicate with gateway 14 if database 26 does not include a command and data designated to be sent to gateway 14. Examples of a time period after which gateway 14 transmits the ping message include a range between 1 second and 1 minute. Other examples of the time period include a range between 1 minute and 30 minutes. Yet other examples of the time period include a range between 30 minutes and 1 hour and 30 minutes. In an alternative embodiment, gateway 14 continuously transmits the ping message via network 18 to server 22. The time period is either zero or infinitely small when gateway 14 continuously transmits the ping message.

If server 22 is ready to communicate with gateway 14, server 22 transmits a positive acknowledgment to gateway 14 and gateway 14 and server 22 communicate information, such as the parameters, commands sent by server 22, and data sent by server 22, with each other. Gateway 14 receives the positive acknowledgment and stops transmitting the ping message. Alternatively, if server 22 is not ready to communicate with gateway 14, server 22 sends a negative acknowledgment to gateway 14. Gateway 14 receives the negative acknowledgment from server 22 and sends the ping message to server 22 after the time period.

It is noted that in an alternative embodiment, gateway 14 and server 22 are coupled to each other via a router that routes information received from gateway 14 or alternatively from network 18 to a destination determined by the router. For example, the router routes information received from gateway 14 to a node in network 18 that is at a shorter distance from the router than distances of remaining nodes within network 18.

Figure 2:
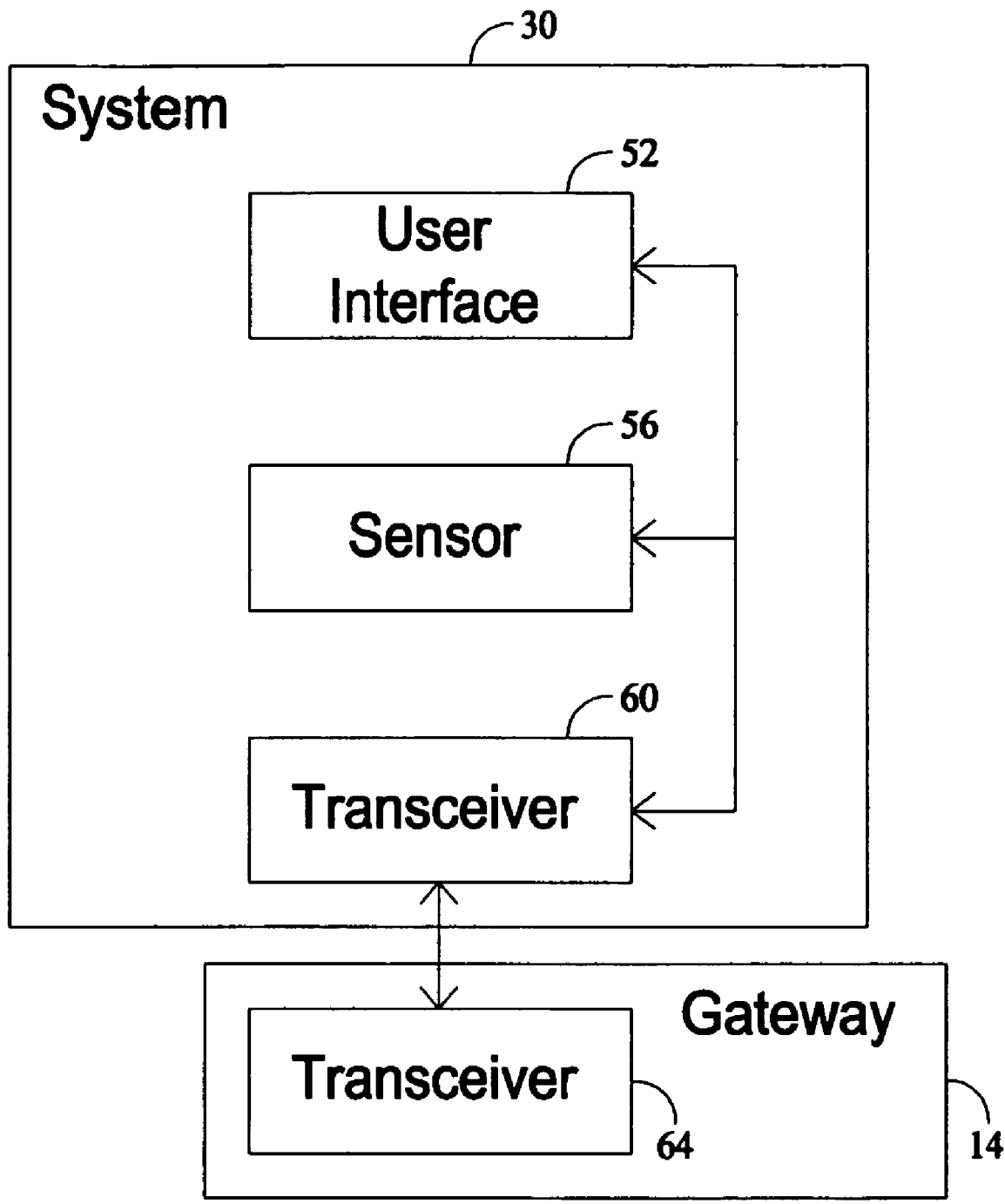
FIG. 2 an embodiment of system coupled to the system of FIG. 1.

FIG. 2 shows an embodiment of system 30 that includes a user interface 52 coupled to a sensor 56 and a transceiver 60. In an alternative embodiment, system 30 includes user interface 52 but does not include sensor 56. In yet another alternative embodiment, system 30 includes sensor 56 but does not include user interface 52. Examples of sensor 56 includes a motion detector located within the security system that monitors motion within the area, a thermistor located within the heating and cooling systems, and a light meter that measures an intensity of light within the area. The thermistor measures ambient temperature within the area. System 30 is coupled to gateway 14 that includes a transceiver 64. An example of transceivers 60 and 64 includes a radio frequency (RF) transceiver that communicates an RF signal.

Sensor 56 senses the parameters and communicates the parameter to transceiver 60. In an alternative embodiment, a user inputs the parameters in system 30 via user interface 52 and the parameters are communicated to transceiver 60. Transceiver 60 receives the parameters and transmits the parameters to transceiver 64.

Figure 3:
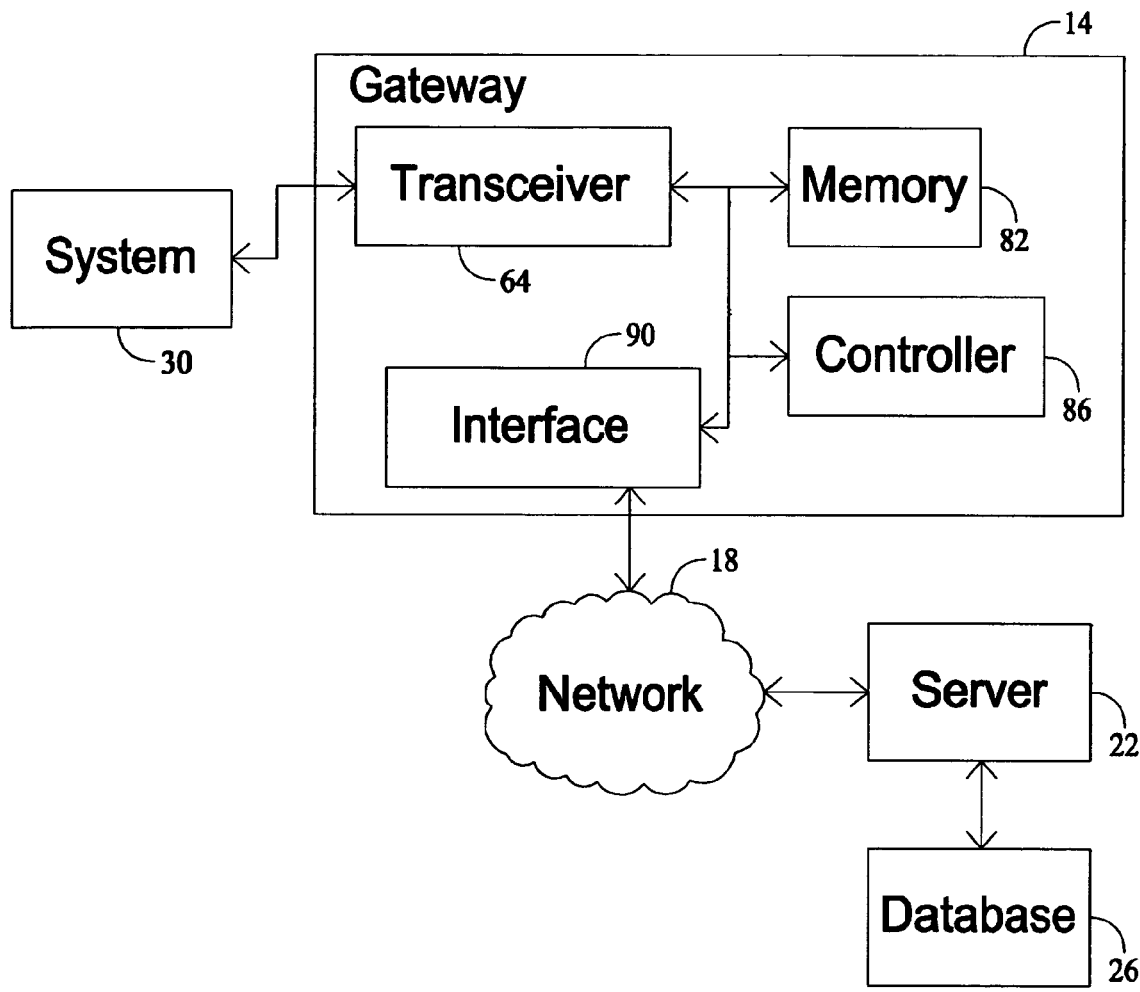
FIG. 3 is a block diagram of an embodiment of a gateway coupled to the system of FIG. 2.
Figure 4:
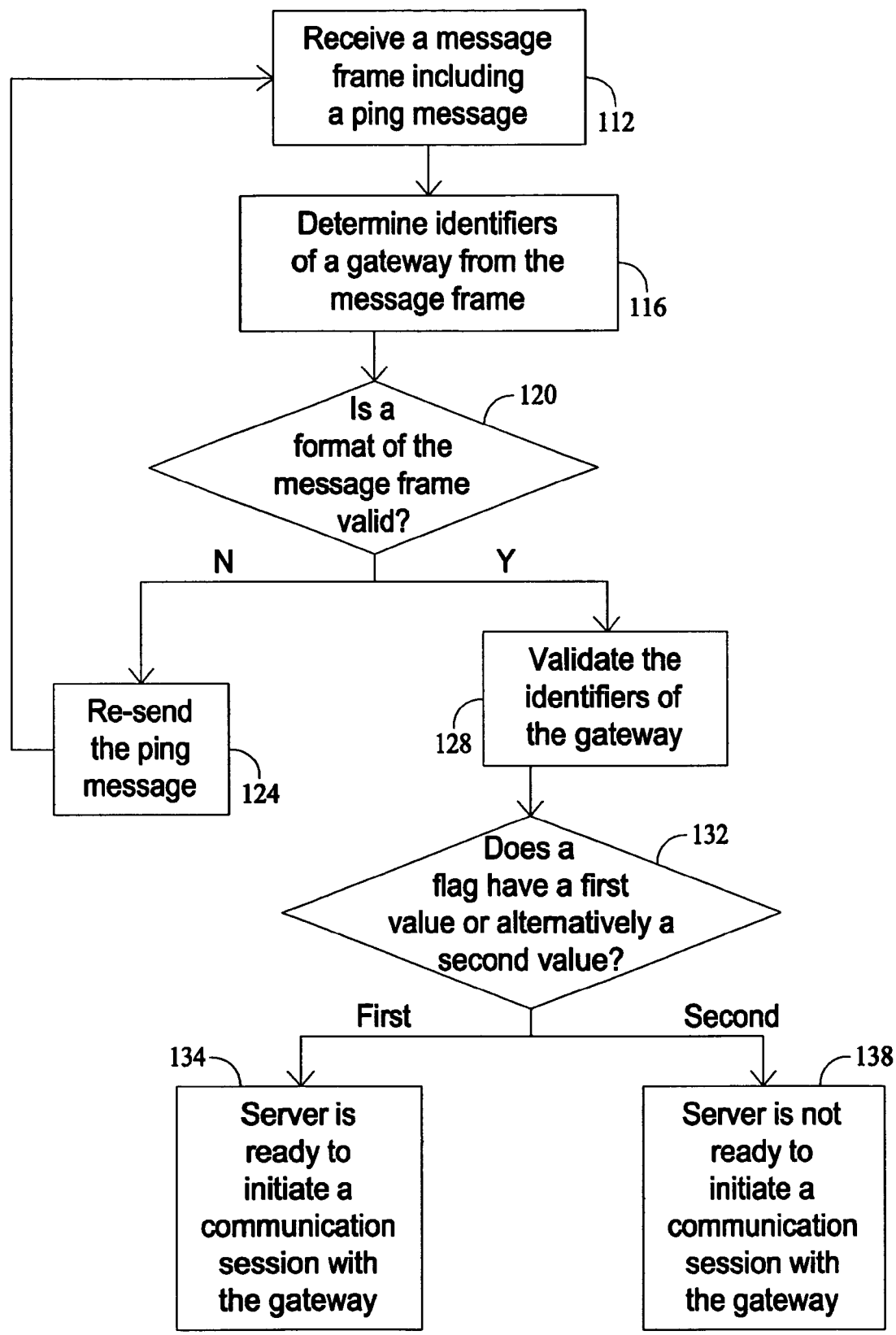
FIG. 4 is a flowchart of an embodiment of a method for communicating messages that is executed by the system of FIG. 1.

FIG. 3 is a block diagram of an embodiment of gateway 14 coupled to system 30 and FIG. 4 is a flowchart of an embodiment of a method for communicating messages. Gateway 14 includes transceiver 64, a memory 82, a controller 86, and an interface 90. Examples of memory 82 include a RAM, a ROM, a PROM and an EEPROM. Controller 86 translates information, such as the parameters, commands sent by server 22, and data sent by server 22, which are received by gateway 14. Controller 86 translates information by executing a protocol, such as a transmission control protocol/internet protocol (TCP/IP), a file transfer protocol (FTP), a Gopher protocol, and a hypertext transfer protocol (HTTP). Software that executes a protocol to translate information received by gateway 14 is stored within memory 82 of gateway 14. Examples of controller 86 include a computer, a processor, a microcontroller, a microcomputer, a programmable logic controller, an application specific integrated circuit, and other programmable circuits. Examples of interface 90 include a network card and a modem. The network card and the modem are configured to enable gateway 14 to communicate across network 18. Transceiver 64 periodically transmits the ping message to server 22 via interface 90 and network 18. The ping message is embedded within a message frame that includes a first portion and a second portion.

A message frame includes at least one of a control byte (CB1), a spare control byte (CB2), a high order byte (LHI), a lower order byte (LLO), a sequence number (SEQ), a message number (MSN), a sub-message (msg), a high order byte (FSH) of a checksum, a low order byte of the checksum (FSL), a dealer identification number (Dx), an account number (Ax), a line number (Lx), an original equipment manufacturer (OEM) code, and a lot number (LN). CB1, CB2, LHI, LLO, SEQ, MSN, msg, FSH, FSL, Dx, Ax, Lx, OEM, and LN are numbers, such as, for instance, binary or hexadecimal numbers. The control byte CB1 within a message frame indicates whether the message frame includes a command. For example, the control byte CB1 within a message frame indicates whether the message frame includes the ping message. If a message frame does not include a command, the message frame includes data. The spare control byte CB2 is usually transmitted as "00". As an example, the spare control byte CB2 is a high order byte of the control byte CB1. The high order byte LHI and the lower order byte LLO within a message frame collectively represent a length of the message frame. The sequence number SEQ within a message frame represents a sequence in which the message frame is sent from gateway 14 to server 22 among a series of message frames sent from gateway 14 to server 22. The message number MSN within a message frame specifies a function of the message frame. For example, if the message number MSN equals 0D85, MSN is the ping message. The sub-message msg within a message frame includes a definition of the message number MSN located within the message frame. A byte of the sub-message identifies whether a message frame that includes the ping message also includes the definition of the message number MSN. In an alternate embodiment, a message frame does not include the sub-message msg.

The dealer identification number Dx, the account number Ax, and the line number Lx within a message frame are identifiers that identify gateway 14 that sent the message frame to server 22. The dealer identification number Dx is represented in the American standard code for information interchange (ASCII). As an example, the dealer identification number Dx is represented in ASCII by characters ranging from 0 to 9. The account number Ax is also represented in ASCII. As an example, the account number Ax is represented in ASCII by hexadecimal characters ranging from 0 to 9 and A to F. The line number Lx is represented in ASCII. As an example, the line number Lx is represented by characters ranging from 0 to 9. The OEM code is represented by one byte. The lot number LN is also represented by one byte. The OEM code and the lot number LN collectively represent a version of the software stored in memory.

The first portion of a message frame is converted into an HTTP format by applying HTTP. The second portion of a message frame is converted into a format other than the HTTP format by applying a protocol other than HTTP. An example of the first portion includes "HTTP GET /folder/program1.aspx?C=" and "HTTP/1.0" that are located within a message frame "HTTP GET/folder/program1.aspx?C=CB1CB2LHILLOSEQMSNmsgFSHFSLDxAxLxOE MLN HTTP/1.0", where "program1.aspx" is a name of a web page that includes the message frame, and CB1, CB2, LHI, LLO, SEQ, MSN, msg, FSH, FSL, Dx, Ax, Lx, OEM, and LN are numbers. Another example of the first portion includes "HTTP GET /folder/programX.aspx?C=" and "HTTP/1.0" that are located within a message frame "HTTP GET /folder/programX.aspx?C=CB1CB2LHILLOSEQMSNmsgFSHFS-LDxAxLxOEMLN HTTP/1.0", where X is a real number, "programX.aspx" is a name of a web page that includes the message frame, and CB1, CB2, LHI, LLO, SEQ, MSN, msg, FSH, FSL, Dx, Ax, Lx, OEM, and LN are numbers. Yet another example of the first portion includes "HTTP GET /folder/messageY.aspx?C=" and "HTTP/1.0" that are located within a message frame "HTTP GET /folder/messageY.aspx?C=CB1CB2LHILLOSEQMSNmsgFSHFS-LDxAxLxOEMLN HTTP/1.0", where Y is a real number, "messageY.aspx" is a name of a web page that includes the message frame, and CB1, CB2, LHI, LLO, SEQ, MSN, msg, FSH, FSL, Dx, Ax, Lx, OEM, and LN are numbers. The names, such as "program1.aspx", "programX.aspx" and "messageY.aspx", sent from gateway 14 to server 22 and an IP address of server 22 are stored within database 26. In an alternate embodiment, the first portion is converted into a TCP/IP format by applying TCP/IP and the second portion is converted into a format other than TCP/IP format by applying a protocol other than TCP/IP.

When server 22 receives 112 a message frame including the ping message from transceiver 64 via interface 90 and network 18, server 22 determines 116 identifiers of gateway 14 from the message frame. Server 22 determines 116 identifiers of gateway 14 by parsing a message frame that includes the identifiers.

When server 22 receives 112 a message frame including the ping message from gateway 14, server 22 also validates 120 a format of the message frame. Server 22 validates 120 a format of a message frame by comparing the length within the message frame to a length stored within a look-up table in database 26. If the length within a message frame is different than the length stored in database 26, server 22 determines that the message frame is invalid. If the length within the message frame equals the length stored in database 26, server 22 determines that the message frame is valid. In an alternative embodiment, server 22 validates 120 a format of a message frame by comparing the checksum within the message frame to a checksum stored within a look-up table in database 26. The comparison of the checksum within the message frame to the checksum stored within a look-up table in database 26 is similar to the comparison of the length within the message frame to the length stored within the look-up table. In yet another alternative embodiment, server 22 validates 120 a format of a message frame by comparing the message number MSN located within the message frame to a message number stored within a look-up table in database 26. The comparison of the message number MSN within the message frame to the message number stored within a look-up table in database 26 is similar to the comparison of the length within the message frame to the length stored within the look-up table.

If server 22 determines that a format of a message frame including the ping message is invalid, server 22 commands gateway 14 to re-send 124 the message frame including the ping message. Server 22 commands gateway 14 to re-send 124 a message frame including the ping message by transmitting, via network 18, a message frame to the gateway 14. An example of a message frame transmitted from server 22 to gateway 14 includes "<HTML><HEAD>C=ZZZvar1Zvar2var3</HEAD></HTML>", where "var1" includes numbers, such as binary or hexadecimal numbers, representing the length of the message frame, "var2" includes numbers, such as binary or hexadecimal numbers, representing a command to re-send the message frame, "var3" includes numbers, such as binary or hexadecimal numbers, representing the checksum of the message frame, and Z is a number, such as a hexadecimal or a binary number. In an alternative embodiment, the message frame "<HTML><HEAD>C=ZZZvar1Zvar2var3</HEAD></HTML>" includes a higher or lower number of Zs than a number of Zs in the message frame. For example, a message frame transmitted from server 22 to gateway 14 includes "<HTML><HEAD>C=ZZZZZvar1 ZZvar2var3</HEAD></HTML>". If gateway 14 receives a command from server 22 to re-send 124 a message frame including the ping message, gateway 14 re-sends 124 the message frame after the time period and the method repeats from a point at which server 22 receives 112 a message frame including the ping message from transceiver 64.

If server 22 determines that a format of a message frame is valid, server 22 validates 128 identifiers of gateway 14 that are located within the message frame by comparing for at least one time the identifiers to identifiers stored in a look-up table within database 26. Server validates 128 identifiers of gateway 14 and located within a message frame by waiting for the time period if the identifiers of gateway 14 do not match the identifiers stored within database 26. After the time period, gateway 14 re-sends a message frame including the ping message and identifiers of gateway 14 to server 22. After the wait, server 22 compares identifiers of gateway 14 resent by server 22 with the identifiers stored within database 26.

When server 22 determines that identifiers of gateway 14 are valid, server 22 checks 132 a flag that lies in the same row as the identifiers stored within a look-up table in database 26. As an example, server 22 checks 132 the flag that lies in the same row as the identifiers stored within a look-up table in database 26 by performing a random access read of the look-up table. When server 22 checks 132 the flag stored within a look-up table in database 26, server 22 records a date and time in the look-up table.

Server 22 checks 132 the flag to determine whether the flag has a first value or alternatively a second value. Examples of the first value include a T and 1. Examples of the second value include an F and a 0. If server 22 determines that the flag equals the first value, server 22 records identifiers that lie in the same row of a look-up table within database 26 as the flag and records an index representing the look-up table. Server 22 records identifiers and the index within a row of a log table stored in database 26.

If server 22 determines that the flag has the first value, server 22 transmits a first command message in a message frame to gateway 14. The first command message notifies gateway 14 that server 22 is ready 134 to communicate with gateway 14. As an example, a message frame that includes the first command message is represented as "<HTML><HEAD>C=ZZZvar4Zvar5var6</HEAD></HTML>, where "var4" includes numbers, such as binary or hexadecimal numbers, representing the length of the message frame, "var5" includes numbers, such as binary or hexadecimal numbers, representing the first command message, "var6" includes numbers, such as binary or hexadecimal numbers, representing the checksum of the message frame, and Z is a number, such as a hexadecimal or a binary number. In an alternative embodiment, the message frame "<HTML><HEAD>C=ZZZvar4Zvar5var6</HEAD>/HTML>" includes a higher or lower number of Zs than a number of Zs in the message frame. For example, a message frame transmitted from server 22 to gateway 14 includes "<HTML><HEAD>C=ZZZZZvar4ZZvar5var6</HEAD></HTML>". Gateway 14 receives a message frame including the first command and initiates a communication session to process commands of server 22 that are pending. As an example, gateway 14 receives the first command message within a web page having an HTML format.

When the first command message is sent from server 22 to gateway 14, controller 86 executes a constant loop program that issues a request for a web page, such as a web page having an HTML format, to server 22 and controller 86 receives the web page from server 22. The constant loop program continues until the gateway 14 and server 22 have information, such as the parameters, to send to each other. During the communication session, when gateway 14 and server 22 do have information to send to each other, gateway 14 informs server 22 to end the communication session and gateway 14 ends the constant loop program.

If server 22 determines that the flag equals the second value, server 22 transmits a second command message in a message frame to gateway 14. The second command message notifies gateway 14 that server 22 is not ready 138 to communicate with gateway 14. As an example, a message frame that includes the second command message is represented as "<HTML><HEAD>C=ZZZvar7Zvar8var9</HEAD></HTML>", where"var7" includes numbers, such as binary or hexadecimal numbers, representing the length of the message frame, "var8" includes numbers, such as binary or hexadecimal numbers, representing the second command message, "var9" includes numbers, such as binary or hexadecimal numbers, representing the checksum of the message frame, and Z is a number, such as a hexadecimal or a binary number. In an alternative embodiment, the message frame "<HTML><HEAD>C=ZZZvar7Zvar8var9</HEAD></HTML>" includes a higher or lower number of Zs than a number of Zs in the message frame. For example, a message frame transmitted from server 22 to gateway 14 includes "<HTML><HEAD>C=ZZZZvar7ZZvar8var9</HEAD></HTML>". Gateway 14 does not execute the constant loop program when gateway 14 receives the second command message.

Server 22 determines whether the time period after which the ping message is sent from gateway 14 exceeds an amount of time stored in database 26. If the time period exceeds the amount of time, server 22 generates an error message and records the error message in the log table in database 26. Server 22 sends a web page including the error message to appropriate users, such as, customers of the security system, a service agency that installed the security system in the area, and a dealer that monitors security within the area.

Technical effects of the herein described systems and methods for communicating messages include diminishing chances that a firewall rejects information sent by server 22 to gateway 14. The chances are diminished because a need for configuring a firewall is reduced and the need is reduced since gateway 14 periodically sends the ping message to server 22 to determine whether server 22 is ready to communicate with gateway 14.

It is noted that techniques illustrated in FIG. 4, in some instances, may be performed sequentially, in parallel, or in an order other than that which is described. For example, when server 22 receives 112 a message frame including the ping message from transceiver 64, server 22 determines 116 identifiers of gateway 14 from the message frame and validates 120 a format of the message frame.

While the invention has been described in terms of various specific embodiments, those skilled in the art will recognize that the invention can be practiced with modification within the spirit and scope of the claims.

What is claimed is:

1. A system for communicating messages, said system comprising:
   a server in direct communication with a database; and
   a gateway that sends a message frame comprising a first portion, a second portion, and a first set of identifiers of said gateway to said server via a network, the first portion converted by applying a first protocol and the second portion converted by applying a second protocol that is different from the first protocol, the second portion embedding a first message, wherein the first message queries said server to determine whether said server is ready to send at least one of a command and data from said database to said gateway, and wherein said server responds to the first message based on whether there is a presence of the at least one of a command and data stored at said database designated to be sent to said gateway, said database storing a second set of identifiers, wherein said server compares the first set of identifiers with the second set of identifiers, if the first set of identifiers do not match the second set of identifiers based on the comparing, the server compares a third set of identifiers of said gateway with the second set of identifiers.

2. A system in accordance with claim 1 wherein the first portion is represented in a hypertext transfer protocol (HTTP) format, and the second portion is represented in a format other than the HTTP format.

3. A system in accordance with claim 1 wherein the first message includes a message placed within a web page.

4. A system in accordance with claim 1 wherein the message frame includes identifiers of said gateway; and a wide area network (WAN), wherein said server receives the message frame via said WAN and validates the identifiers.

5. A system in accordance with claim 1 wherein said server determines whether a format of the message frame is valid and sends a second message to said gateway if said server determines that the format is invalid, and the second message requests said gateway to re-send the message frame.

6. A system in accordance with claim 1 further comprising a database coupled to said server and including a flag, wherein said server determines whether the flag equals one of a first value and second value and sends a second message to said gateway if the flag equals the first value, and the second message represents that said server is ready to communicate with said gateway.

7. A system in accordance with claim 1 further comprising a database coupled to said server and including a flag, wherein said server determines whether the flag equals one of a first value and second value and sends a second message to said gateway if the flag equals to the second value, and the second message represents that said server is not ready to communicate with said gateway.

8. A system in accordance with claim 1 wherein the first message is sent periodically from said gateway to said server.

9. A system in accordance with claim 1 wherein said server determines if the first message is sent to said server within a time period and generates an error message if said server determines that said gateway did not send the first message within the time period.

10. A system in accordance with claim 1 wherein said gateway is coupled to at least one of a security system, a heating system, a cooling system, and a lighting system.

11. A system for communicating messages, said system comprising:
    a server in communication with a database; and
    a gateway that sends a message frame to said server, wherein the message frame includes a first portion, a second portion, and a first set of identifiers of said gateway to said server via a network, the first portion converted by applying a first protocol and the second portion of the message frame converted by applying a second protocol that is different from the first protocol, the first portion identifies said gateway that sent the message frame to said server, the second portion queries said server to determine whether said server is ready to send at least one of a command and data from said database to said gateway, and wherein said server responds to a query based on whether there is a presence of the at least one of a command and data stored at said database designated to be sent to said gateway, said database storing a second set of identifiers, wherein said server compares the first set of identifiers with the second set of identifiers, if the first set of identifiers do not match the second set of identifiers based on the comparing, the server compares a third set of identifiers of said gateway with the second set of identifiers.

12. A system for communicating messages in accordance with claim 11, wherein the first protocol is a hypertext transfer protocol (HTTP).

13. A system for communicating messages in accordance with claim 11 further comprising a wide area network (WAN), wherein said server receives the message frame via said WAN and validates identifiers of said gateway included within the message frame.

14. A method for communicating messages, said method comprising:
    coupling a gateway to a server via a network;
    coupling the server to a database;
    sending by the gateway a message frame including a first portion, a second portion, and a first set of identifiers of the gateway to the server via a network, the first portion converted by applying a first protocol and the second portion converted by applying a second protocol that is different from the first protocol, the second portion embedding a first message; and querying the server with the first message to determine whether the server is ready to send at least one of a command and data from the database to the gateway, wherein the server responds to the first message based on whether there is a presence of the at least one of a command and data stored at the database designated to be sent to the gateway, the database storing a second set of identifiers, wherein the server compares the first set of identifiers with the second set of identifiers, if the first set of identifiers do not match the second set of identifiers based on the comparing, the server compares a third set of identifiers of the gateway with the second set of identifiers.

15. A method in accordance with claim 14 further comprising: embedding, within the message frame, a message that queries the server, wherein the message queries whether the server is ready to communicate with the gateway; representing the first portion in a hypertext transfer protocol (HTTP) format; and representing the second portion in a format other than the HTTP format.

16. A method in accordance with claim 14 further comprising: embedding, within the message frame, a message that queries the server, wherein the message queries whether the server is ready to communicate with the gateway, the second portion includes the message; representing the first portion represented in a hypertext transfer protocol (HTTP) format; and representing the second portion represented in a format other than the HTTP format.

17. A method in accordance with claim 14 further comprising: embedding, within a web page, a message that queries the server, wherein the message queries whether the server is ready to communicate with the gateway.

18. A method in accordance with claim 14 further comprising: embedding, within the message frame, a message that queries the server, wherein the message queries whether the server is ready to communicate with the gateway, and the message frame includes identifiers of the gateway; receiving the message frame from the gateway; and validating a format of the message frame.

* * * * *